United States Patent
Saito

(10) Patent No.: US 12,012,104 B2
(45) Date of Patent: Jun. 18, 2024

(54) DRIVING CONTROL METHOD AND DRIVING CONTROL DEVICE

(71) Applicant: Nissan Motor Co., Ltd., Yokohama (JP)

(72) Inventor: Shinya Saito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/630,416

(22) PCT Filed: May 28, 2021

(86) PCT No.: PCT/JP2021/020563
§ 371 (c)(1),
(2) Date: Jan. 26, 2022

(87) PCT Pub. No.: WO2022/249490
PCT Pub. Date: Dec. 1, 2022

(65) Prior Publication Data
US 2023/0382387 A1    Nov. 30, 2023

(51) Int. Cl.
*B60W 30/18*    (2012.01)

(52) U.S. Cl.
CPC ... *B60W 30/18163* (2013.01); *B60W 2520/00* (2013.01)

(58) Field of Classification Search
CPC ....... B60W 30/18163; B60W 2520/00; B60W 2552/30; B60W 30/045; B60W 30/18145; B60W 2520/125
See application file for complete search history.

(56) References Cited

U.S. PATENT DOCUMENTS

| | | | |
|---|---|---|---|
| 2004/0260455 A1* | 12/2004 | Dort | G08G 1/096783 701/117 |
| 2021/0276550 A1 | 9/2021 | Gotou et al. | |
| 2022/0083065 A1* | 3/2022 | Liu | G01C 21/26 |

FOREIGN PATENT DOCUMENTS

| | | |
|---|---|---|
| JP | 2001-030797 A | 2/2001 |
| JP | 2019-171965 A | 10/2019 |
| WO | 2019/008649 A1 | 1/2019 |

* cited by examiner

*Primary Examiner* — Tyler J Lee
*Assistant Examiner* — Yufeng Zhang
(74) *Attorney, Agent, or Firm* — Young Basile Hanlon & MacFarlane, P.C.

(57) ABSTRACT

A driving control device controls driving of a subject vehicle so that front-rear acceleration of the subject vehicle when traveling along a curved route becomes an acceleration upper limit or less. Provided that a merging point exists in a certain section on the downstream side of the curved route, when the distance between the position of the subject vehicle traveling along the curved route and the merging point is a predetermined distance or less, the control device sets the acceleration upper limit to a corrected acceleration upper limit that is higher than a reference acceleration upper limit when the merging point does not exist in the certain section.

9 Claims, 6 Drawing Sheets

DRIVING CONTROL METHOD AND DRIVING CONTROL DEVICE

TECHNICAL FIELD

The present invention relates to a driving control method and a driving control device.

BACKGROUND

JP2019-171965A describes a driving or travel control device that delays the timing of accelerating a subject vehicle near the exit of a curve section as the lateral position or yaw angle of the subject vehicle deviates from a target travel route.

SUMMARY

However, the travel control device described in JP2019-171965A delays the timing of acceleration in accordance with the deviation degree of the lateral position or yaw angle of the subject vehicle with respect to the target travel route; therefore, when the subject vehicle's lane merges into another lane on the downstream side of the curve section, the vehicle speed of the subject vehicle may not be increased to a target speed required at the merging point before the subject vehicle reaches the merging point.

A problem to be solved by the present invention is to provide a driving control method and a driving control device with which when the subject vehicle's lane merges into another lane on the downstream side of a curve section of the subject vehicle's lane, the vehicle speed of the subject vehicle can be accelerated so as to reach the target speed required at the merging point.

The present invention solves the above problem through, provided that a merging point exists in a certain section on the downstream side of a curved route, when a distance between the position of the subject vehicle traveling along the curved route and the merging point is a predetermined distance or less, setting the acceleration upper limit to a corrected acceleration upper limit that is higher than a reference acceleration upper limit when the merging point does not exist in the certain section.

According to the present invention, when the subject vehicle's lane merges into another lane on the downstream side of a curve section of the subject vehicle's lane, the acceleration upper limit is changed higher than the reference acceleration upper limit, and the vehicle speed of the subject vehicle can therefore be accelerated so as to reach the target speed required at the merging point.

DETAILED DESCRIPTION

First Embodiment

A first embodiment of the present invention will be described with reference to FIGS. 1 to 4.

Figure 1:
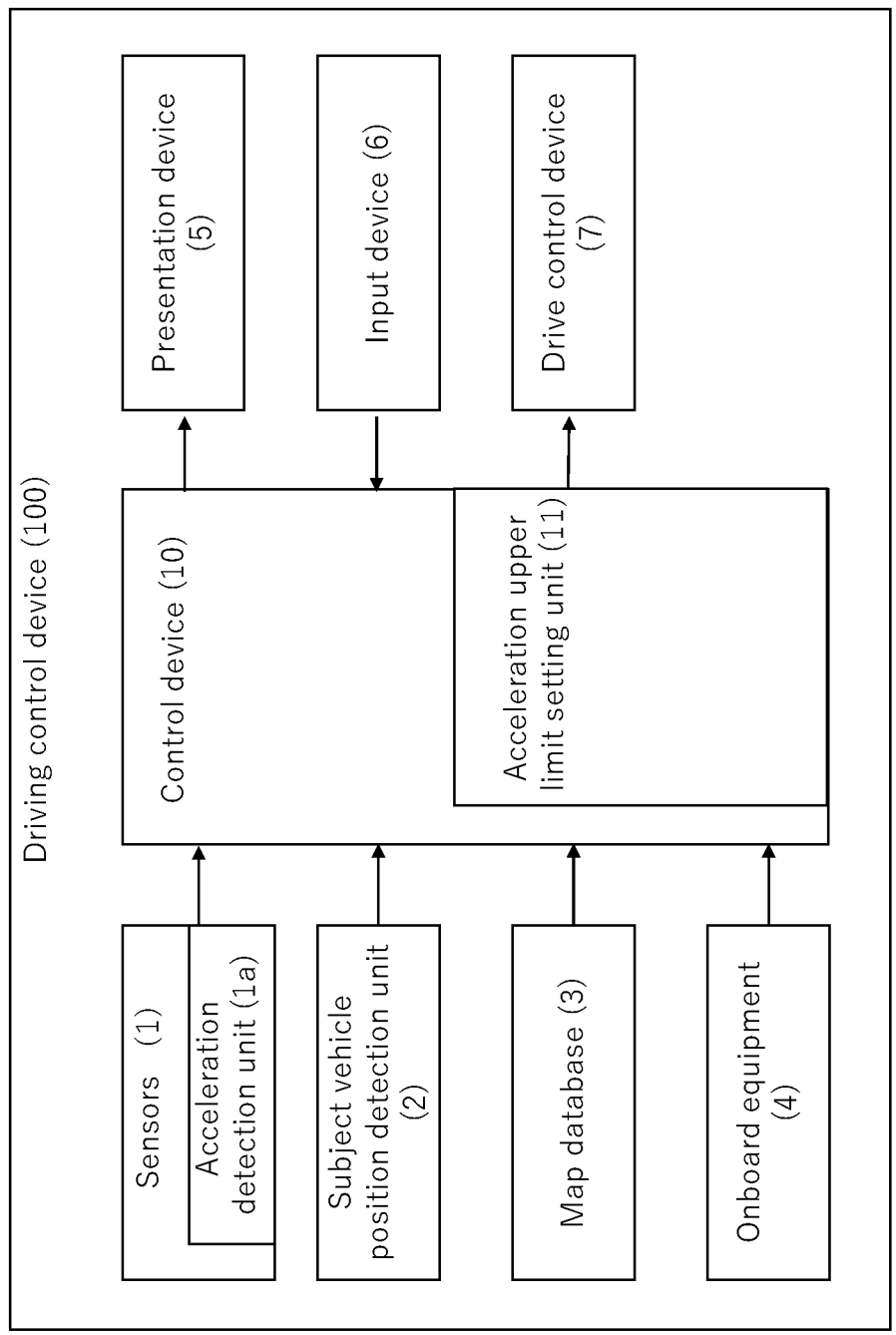
FIG. 1 is a block diagram illustrating the configuration of a driving control device according to a first embodiment.

FIG. 1 is a block diagram illustrating the configuration of a driving control device 100 according to the present embodiment. The driving control device 100 according to the present embodiment represents an embodiment for carrying out the driving control method according to the present invention. As illustrated in FIG. 1, the driving control device 100 according to the present embodiment includes sensors 1, a subject vehicle position detection unit 2, a map database 3, onboard equipment 4, a presentation device 5, an input device 6, a drive control device 7, and a control device 10. These devices are connected to one another, for example, via a controller area network (CAN) or other onboard LAN for mutually exchanging information.

The sensors 1 include an acceleration detection unit 1a. The acceleration detection unit 1a is an acceleration sensor that detects the transverse acceleration and front-rear acceleration of the subject vehicle. The detection results of the acceleration detection unit 1a are output to the control device 10 at predetermined time intervals. The sensors 1 may include, in addition to the acceleration detection unit 1a, for example, a vehicle speed sensor that detects the vehicle speed of the subject vehicle, a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing on the right and left sides of the subject vehicle, a touch sensor (capacitance sensor) that detects whether or not the driver holds the steering wheel, an onboard camera that captures images of the driver, etc.

The subject vehicle position detection unit 2 is composed of a GPS unit, a gyro-sensor, a vehicle speed sensor, etc. Specifically, the subject vehicle position detection unit 2 uses the GPS unit to detect radio waves transmitted from a plurality of communication satellites. This allows the subject vehicle position detection unit 2 to periodically acquire the positional information of the subject vehicle. The subject vehicle position detection unit 2 further detects the current position of the subject vehicle (subject vehicle position) based on the acquired positional information of the subject vehicle, angle variation information acquired from the gyro-sensor, and the vehicle speed acquired from the vehicle speed sensor. The information indicating the subject vehicle position detected by the subject vehicle position detection unit 2 is output to the control device 10 at predetermined time intervals.

The map database 3 is a memory that is accessible by the control device 10. The map database 3 stores high-precision digital map information (high-precision map, dynamic map). The map information stored in the map database 3 includes three-dimensional high-precision map information including positional information of various facilities and specific points. The three-dimensional high-precision map information stored in the map database 3 is three-dimensional map information based on information regarding the shape and height of a road that are detected when a vehicle for data acquisition travels on an actual road. The three-dimensional high-precision map information also includes a curved route and the size of the curve (e.g., curvature or radius of curvature), identification information of a plurality of lanes of a road, and information indicating a merging point and a branching point of a road, a tollgate, a position at which the number of lanes is reduced, the position of a service area/parking area, etc.

The onboard equipment 4 includes various modules equipped in the vehicle. The onboard equipment 4 is operated by the driver's operation. The onboard equipment 4 includes, for example, a steering wheel, an accelerator pedal, a brake pedal, a navigation device, direction indicators, wipers, lights, a horn, and other specific switches. When the driver operates the onboard equipment 4, information indicating the operation content is output to the control device 10.

The presentation device 5 is represented, for example, by devices such as a display of a navigation device, a display incorporated in a rearview mirror, a display incorporated in a meter unit, a head-up display projected on a windshield, and a speaker of an audio device. The presentation device 5 informs the driver of various information items regarding the travel of the subject vehicle under the control by the control device 10.

The input device 6 is, for example, a device such as a button switch or a touch panel disposed on a display screen with which the driver can input information by the manual operation or a microphone with which the driver can input information by the voice.

The drive control device 7 controls the driving of the subject vehicle. For example, the drive control device 7 uses an autonomous speed control function to control the operation of the drive mechanism (including the operation of an internal-combustion engine in the case of an engine car or the operation of an electric motor for travel in the case of an electric car and also including the torque distribution for an internal-combustion engine and an electric motor for travel in the case of a hybrid car) and the brake operation for adjusting the acceleration/deceleration and the vehicle speed. In addition, the drive control device 7 uses an autonomous steering control function to control the operation of the steering actuator, thereby executing the steering control of the subject vehicle. Additionally or alternatively, the drive control device 7 executes lane keeping control. Specifically, the drive control device 7 detects the lane markers of a lane in which the subject vehicle travels, and controls the traveling position (lateral position) of the subject vehicle in the road width direction so that the subject vehicle travels at the center of the lane in which the subject vehicle travels. The execution of the lane keeping control function executed by the drive control device 7 is switched ON/OFF by the driver's operation or in an automated or autonomous manner. Thus, the drive control device 7 controls the operation of the drive mechanism and the brake operation thereby to control the acceleration/deceleration of the subject vehicle.

The control device 10 is composed of a read only memory (ROM) that stores programs for controlling the travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit. The control device 10 executes the programs stored in the ROM using the CPU thereby to transmit, based on autonomous travel control function, the control commands regarding the vehicle speed and steering of the subject vehicle to the drive control device 7.

In addition, the control device 10 acquires information regarding the traveling state of the subject vehicle from the sensors 1. For example, the control device 10 acquires the external image information around the vehicle captured by the front camera and the rear camera and/or the detection results obtained by the front radar, the rear radar, and the side radars. Additionally or alternatively, the control device 10 acquires the vehicle speed information of the subject vehicle detected by the vehicle speed sensor. Additionally or alternatively, the control device 10 acquires the acceleration/deceleration of the subject vehicle from the acceleration detection unit 1a.

The control device 10 also acquires information on the current position of the subject vehicle as the travel information from the subject vehicle position detection unit 2. The control device 10 further acquires the positional information of a curved route and the size of the curve (e.g., curvature or radius of curvature), a merging point, a branching points, etc. from the map database 3. In addition, the control device 10 acquires the information on an operation of the onboard equipment 4 performed by the driver from the onboard equipment 4.

Figure 2:
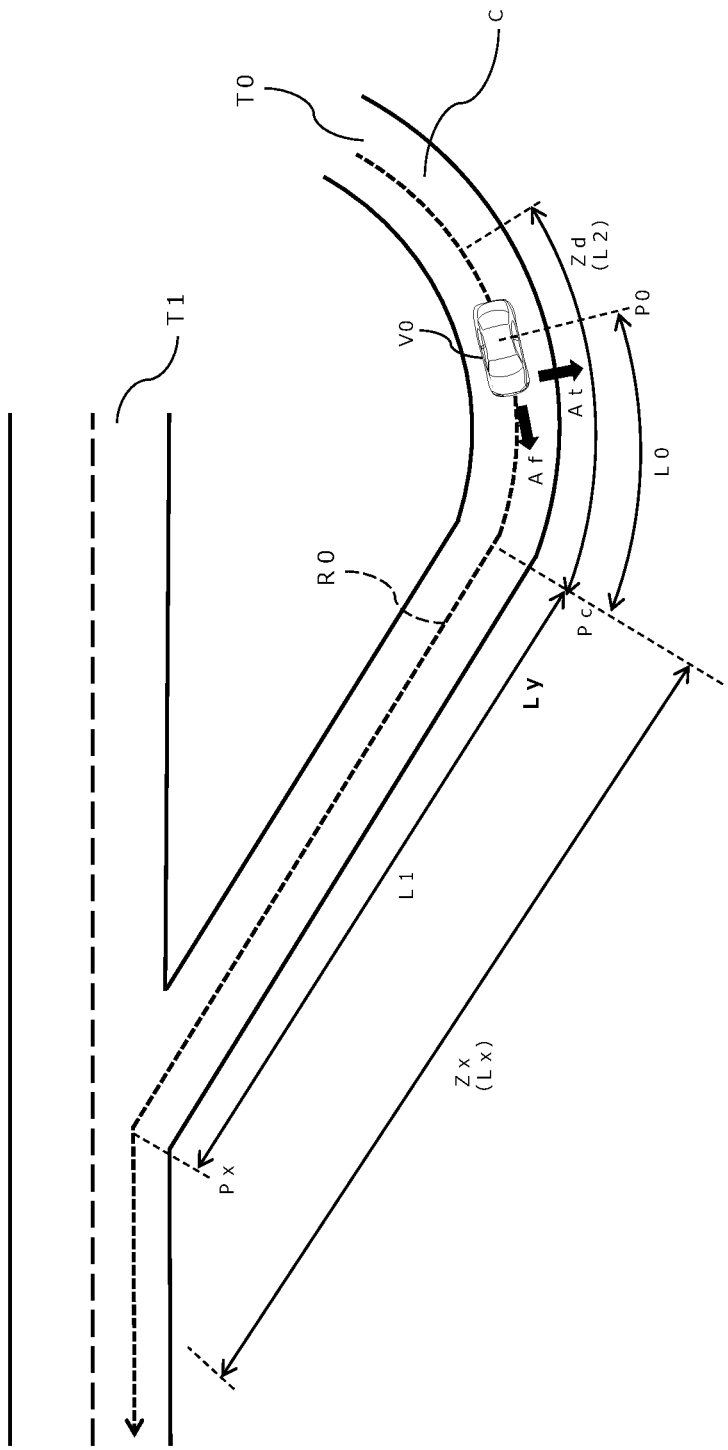
FIG. 2 is a diagram exemplifying the positional relationship between a position of the subject vehicle traveling along a curved route and a merging point.

The control device 10 has an acceleration upper limit setting unit 11. As illustrated in FIG. 2, the acceleration upper limit setting unit 11 sets an acceleration upper limit in the control of a front-rear or longitudinal acceleration Af of a subject vehicle V0 based on a transverse or lateral acceleration At when the subject vehicle V0 travels along a curved route C. In other words, when the subject vehicle V0 travels along the curved route C, the control device 10 controls the driving of the subject vehicle via the drive control device 7 so that the front-rear acceleration Af of the subject vehicle does not become higher than the acceleration upper limit which is set by the acceleration upper limit setting unit 11. That is, the control device 10 sets the acceleration upper limit when the subject vehicle V0 travels along the curved route C, thereby to prevent the ride quality for the occupants of the subject vehicle V0 from becoming uncomfortable due to an excessively increased transverse acceleration (lateral G) with the sudden acceleration in the front-rear direction (traveling direction). Along the curved route C, the larger the front-rear acceleration Af of the subject vehicle V0, the larger the transverse acceleration At.

While the subject vehicle V0 is traveling along the curved route C, the control device 10 generates a vehicle speed command based mainly on the curvature or radius of curvature of the curved route C. When the subject vehicle V0 is traveling along the curved route C, the control device 10 generates the vehicle speed command so as to lower the vehicle speed as compared with when the subject vehicle V0 is traveling in a straight lane. That is, when the position of the subject vehicle V0 shifts from a straight route to a curved route, the control device 10 generates the vehicle speed command so that the subject vehicle V0 decelerates. The control device 10 outputs the vehicle speed command to the drive control device 7.

A method of setting the acceleration upper limit will then be described with reference to FIGS. 2 to 4. This method is executed by the acceleration upper limit setting unit 11.

Figure 3:
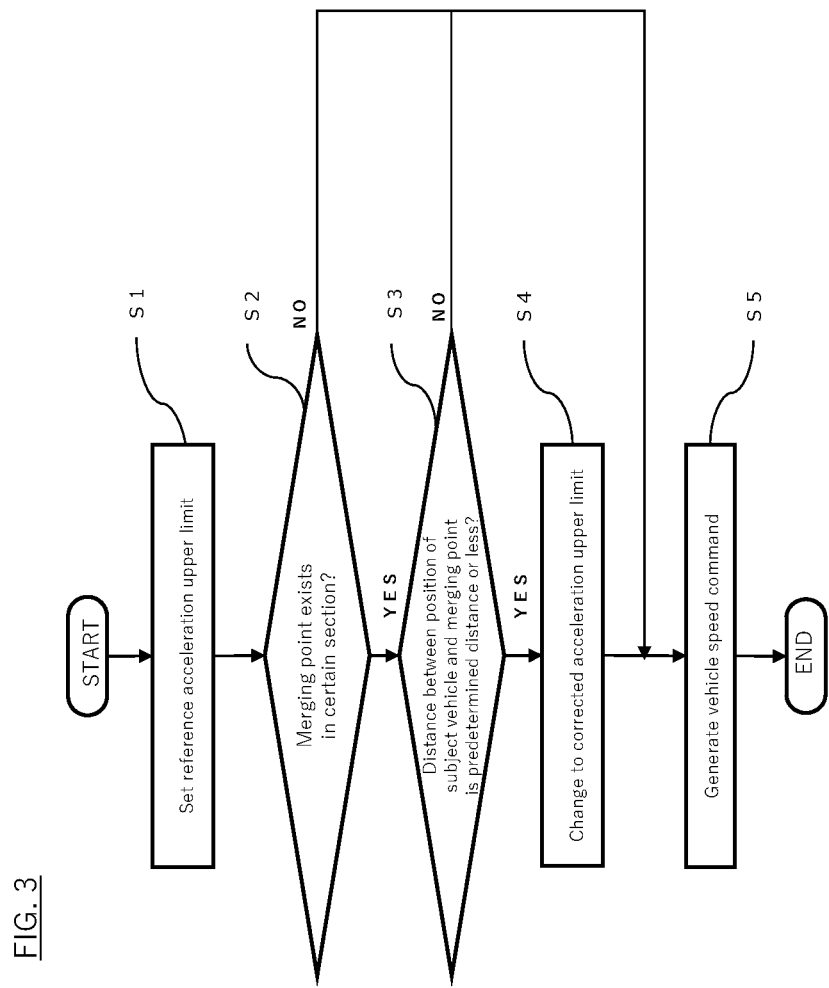
FIG. 3 is a flowchart illustrating a control method executed by the driving control device illustrated in FIG. 1.

First, in step S1 of FIG. 3, the acceleration upper limit setting unit 11 sets a reference acceleration upper limit AU0. The reference acceleration upper limit AU0 is indicated by a dashed-dotted line graph in FIG. 4. As illustrated in FIG. 4, when the transverse acceleration At detected by the acceleration detection unit 1a is lower than a predetermined target transverse acceleration Ata, the acceleration upper limit setting unit 11 sets the reference acceleration upper limit AU0 higher as a deviation (transverse acceleration deviation dAt) of the transverse acceleration At with respect to the target transverse acceleration Ata is larger. That is, the control device 10 sets a corrected acceleration upper limit AU1 so that the corrected acceleration upper limit corresponding to a first transverse acceleration becomes higher than the corrected acceleration upper limit corresponding to a second transverse acceleration whose height relative to the target transverse acceleration Ata is lower than the first transverse acceleration. In the example illustrated in FIG. 4, the corrected acceleration upper limit AU1 is set to be continuously increased as the relative height of the transverse acceleration At with respect to the target transverse acceleration Ata becomes lower, but the present invention is not limited to this, and the corrected acceleration upper limit AU1 may be changed in a stepwise manner in accordance with the relative height of the transverse acceleration At with respect to the target transverse acceleration Ata. On the other hand, as illustrated in the left-side area of the graph of FIG. 4, when the transverse acceleration At is the same value as the target transverse acceleration Ata or the transverse acceleration At is higher than the target transverse acceleration Ata, the reference acceleration upper limit AU0 is 0. That is, in the present embodiment, when the transverse acceleration At is the target transverse acceleration Ata or more, the control device 10 does not accelerate the subject vehicle V0 in the front-rear direction. Through this setting, the control device 10 prevents the transverse acceleration At of the subject vehicle V0 from becoming excessively large with the acceleration in the front-rear direction and suppresses uncomfortable feeling in the ride quality given to the occupants of the subject vehicle V0. The target transverse acceleration refers to a reference value representing an upper limit of the transverse acceleration that is experimentally determined so that the uncomfortable feeling in the ride quality is not given to the occupants of the subject vehicle V0.

Then, in step S2 of FIG. 3, the control device 10 determines whether or not a merging point Px exists in a certain section Zx on the downstream side of the curved route C, as illustrated in FIG. 2, based on the map information of the map database 3. The merging point Px refers to a point at which a subject vehicle's lane T0 merges into another lane T1. The subject vehicle's lane T0 is a lane in which the subject vehicle V0 travels. When a distance L1 between an end point Pc on the downstream side of the curved route C and the merging point Px is a distance Lx of the certain section Zx or less, the control device 10 determines that the merging point Px exists in the certain section Zx on the downstream side of the curved route C. The distance Lx of the certain section Zx is a distance to such an extent that the subject vehicle V0 can reach the target vehicle speed at the merging point Px by accelerating before passing through the end point Pc on the downstream side of the curved route C.

In the following description, the "distance" means a length along a travel trajectory R0 of the subject vehicle V0 (this length is a distance along which the subject vehicle V0 travels).

When a determination is made in step S2 of FIG. 3 that the merging point Px does not exist in the certain section Zx, the control device 10 advances the process to step S5 and generates a vehicle speed command based on the set reference acceleration upper limit AU0. Specifically, in step S5, the vehicle speed of the subject vehicle V0 is set in accordance with the curvature of the curved route C and is set so that the front-rear acceleration Af becomes the reference acceleration upper limit AU0 or less. That is, when the merging point Px does not exist in the certain section Zx, the acceleration upper limit is set to the reference acceleration upper limit AU0. On the other hand, when a determination is made in step S2 that the merging point Px exists in the certain section Zx, the control device 10 advances the process to step S3.

In step S3, the control device 10 determines, based on a position P0 of the subject vehicle V0 detected by the subject vehicle position detection unit 2, whether or not a distance (L1+L0) between the position P0 of the subject vehicle V0 and the merging point Px is a predetermined distance Ly (=L1+L2) or less. Here, as illustrated in FIG. 2, when the distance between the position P0 of the subject vehicle V0 traveling along the curved route C and the merging point Px is the predetermined distance Ly or less, this means that the subject vehicle V0 is traveling in a downstream curve section Zd. In the curved route C, the downstream curve section Zd is a section whose distance from the end point Pc on the downstream side is a predetermined downstream curve distance L2. That is, when determining that the subject vehicle V0 is traveling in the downstream curve section Zd, the control device 10 determines that the distance (L1+L0) between the position P0 of the subject vehicle V0 and the merging point Px is the predetermined distance Ly (=L1+L2) or less. In other words, when a distance L0 between the position P0 of the subject vehicle V0 and the end point Pc on the downstream side of the curved route C is the downstream curve distance L2 or less, the control device 10 determines that the distance (L1+L0) between the position P0 of the subject vehicle V0 traveling along the curved route C and the merging point Px is the predetermined distance Ly or less. The control device 10 sets the predetermined distance Ly and the downstream curve distance L2 so that the subject vehicle V0 can reach the target vehicle speed at the merging point Px by accelerating at a point at which the distance to the merging point Px is the predetermined distance Ly.

When a determination is made in step S3 of FIG. 3 that the distance (L1+L0) between the position P0 of the subject vehicle V0 and the merging point Px is longer than the predetermined distance Ly, the control device 10 advances the process to step S5 and generates a vehicle speed command based on the reference acceleration upper limit AU0. That is, when the subject vehicle V0 is traveling on the upstream side of the downstream curve section Zd in the curved route C, the acceleration upper limit is set to the reference acceleration upper limit AU0. On the other hand, when a determination is made in step S3 that the distance (L1+L0) between the position P0 of the subject vehicle V0 and the merging point Px is the predetermined distance Ly or less, the control device 10 advances the process to step S4.

In step S4, the control device 10 changes the acceleration upper limit to the corrected acceleration upper limit AU1 which is higher than the reference acceleration upper limit AU0. That is, as illustrated in FIG. 2, when the subject vehicle V0 traveling on the upstream side of the downstream curve section Zd of the curved route C enters the downstream curve section Zd of the curved route C, the control device 10 switches the acceleration upper limit from the reference acceleration upper limit AU0 to the corrected acceleration upper limit AU1.

Figure 4:
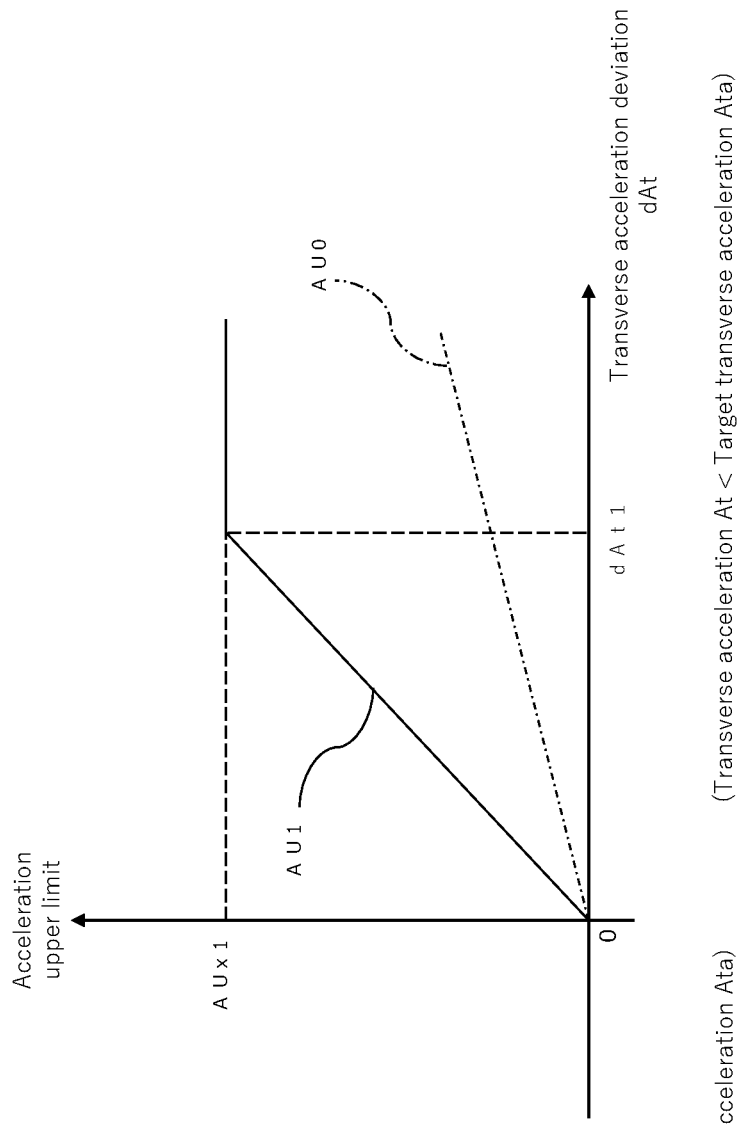
FIG. 4 is a graph illustrating the relationship between an acceleration upper limit that is set by the control method illustrated in FIG. 3 and a transverse acceleration deviation.

Specifically, as illustrated by a solid line graph in FIG. 4, when the transverse acceleration At is lower than the target transverse acceleration Ata, the acceleration upper limit setting unit 11 sets the corrected acceleration upper limit AU1 higher as the transverse acceleration deviation dAt is larger in a range in which the transverse acceleration deviation dAt is 0 to dAt1 (0<dAt≤dAt1). That is, the control device 10 sets the corrected acceleration upper limit AU1 higher as the transverse acceleration At of the subject vehicle V0 is relatively lower than the target transverse acceleration Ata in the range in which the transverse acceleration deviation dAt is 0 to dAt1. In the range in which the transverse acceleration deviation dAt is 0 to dAt1, the rate of change in the corrected acceleration upper limit AU1 with respect to the transverse acceleration deviation dAt is larger than the rate of change in the reference acceleration upper limit AU0 with respect to the transverse acceleration deviation dAt. When the transverse acceleration deviation dAt is dAt1, the corrected acceleration upper limit AU1 is an acceleration upper limit threshold AUx1, and the corrected acceleration upper limit AU1 is constant at the acceleration upper limit threshold AUx1 in a range in which the transverse acceleration deviation dAt is larger than dAt1. That is, the control device 10 sets the corrected acceleration upper limit AU1 so that it becomes a predetermined acceleration upper limit threshold AUx1 or less. The acceleration upper limit threshold AUx1 is a value that is preliminarily and experimentally determined so that the uncomfortable feeling felt by the occupants does not become excessively large due to the sudden acceleration of the subject vehicle V0 in the front-rear direction.

When changing the acceleration upper limit to the corrected acceleration upper limit AU1 in step S4 of FIG. 3, the control device 10 generates a vehicle speed command based on the corrected acceleration upper limit AU1 in step S5. Specifically, in step S5, the vehicle speed of the subject vehicle V0 is set in accordance with the curvature of the curved route C and is set so that the front-rear acceleration Af becomes the corrected acceleration upper limit AU1 or less. The control device 10 sets the vehicle speed so that the vehicle speed of the subject vehicle V0 reaches the target vehicle speed at the time of merging at the merging point Px.

As described above, provided that the merging point Px exists in the certain section Zx on the downstream side of the curved route C, when the distance between the position P0 of the subject vehicle Vo traveling along the curved route C and the merging point Px is the predetermined distance Ly or less, the control device 10 of the driving control device 100 according to the present embodiment sets the acceleration upper limit to the corrected acceleration upper limit AU1 that is higher than the reference acceleration upper limit AU0. Through this operation, the driving control device 100 can relax the suppression of acceleration of the subject vehicle V0 traveling along the curved route C and put ahead the timing of acceleration of the subject vehicle V0 as compared with when the merging point Px does not exist in the certain section Zx on the downstream side of the curved route C. The driving control device 100 can therefore accelerate the subject vehicle V0 early so that the vehicle speed of the subject vehicle V0 reaches the target vehicle speed at the time of merging at the merging point Px. Thus, the driving control device 100 can prevent the subject vehicle V0 from losing the opportunity to merge into the other lane T1 due to the insufficient speed of the subject vehicle V0 at the merging point Px. Moreover, the occupants of the subject vehicle V0 can experience that the subject vehicle V0 is accelerating toward the merging point Px at a fast pace.

Furthermore, when the distance between the position P0 of the subject vehicle V0 and the merging point Px becomes the predetermined distance Lx or less, the control device 10 changes the acceleration upper limit from the reference acceleration upper limit AU0 to the corrected acceleration upper limit AU1. Through this operation, the driving control device 100 raises the acceleration upper limit from the reference acceleration upper limit AU0 to the corrected acceleration upper limit AU1 at the timing when the subject vehicle V0 traveling along the curved route C approaches the merging point Px, and can accelerate the subject vehicle V0 at a fast pace toward the merging point Px.

Furthermore, the control device 10 sets the corrected acceleration upper limit AU1 based on the transverse acceleration deviation dAt of the transverse acceleration At with respect to the target transverse acceleration Ata. Through this operation, the driving control device 100 can set the corrected acceleration upper limit AU1 with reference to the predetermined target transverse acceleration Ata so that the ride quality for the occupants of the subject vehicle V0 traveling along the curved route C does not excessively deteriorate.

Furthermore, the control device 10 sets the corrected acceleration upper limit AU1 higher as the transverse acceleration At of the subject vehicle V0 is relatively lower than the target transverse acceleration Ata in at least a part of the numerical range (0 to dAt1) of the transverse acceleration deviation dAt. Through this operation, the control device 10 can set the corrected acceleration upper limit AU1 higher and relax the suppression of acceleration of the subject vehicle V0 within the range in which the transverse acceleration At can be increased in accordance with the target transverse acceleration Ata.

Furthermore, the control device 10 sets the corrected acceleration upper limit AU1 so that the corrected acceleration upper limit AU1 becomes the predetermined acceleration upper limit threshold AUx1 or less. Through this operation, the control device 10 prevents the corrected acceleration upper limit AU1 from becoming excessively high. That is, the control device 10 can suppress the sudden acceleration in the front-rear direction of the subject vehicle V0 traveling along the curved route C.

The present invention is not limited to the present embodiment, and the control device 10 may set the corrected acceleration upper limit AU1 higher than the acceleration upper limit threshold AUx1 without setting the acceleration upper limit threshold AUx1.

Furthermore, when the subject vehicle V0 is traveling in the downstream curve section Zd of the curved route C, the control device 10 determines that the distance (L1+L0) between the position P0 of the subject vehicle V0 and the merging point Px is the predetermined distance Ly or less. Through this operation, when the subject vehicle V0 is traveling in a section near the end point Pc on the downstream side of the curved route C, the control device 10 can set the acceleration upper limit to the corrected acceleration upper limit AU1 higher than the reference acceleration upper limit AU0.

When the acceleration upper limit is changed from the reference acceleration upper limit AU0 to the corrected acceleration upper limit AU1, the presentation device 5 of the driving control device 100 may present information indicating the change of the acceleration upper limit to the occupants of the subject vehicle V0.

In the present embodiment, the subject vehicle V0 is autonomously traveling by the automated driving function of the control device 10, but the present invention is not limited to this, and the control device 10 may sets the acceleration upper limit along the curved route C also when the driver of the subject vehicle V0 manually performs the vehicle speed control.

Second Embodiment

The second embodiment according to the driving control method using the driving control device 100 will be described with reference to FIGS. 5 and 6. The same reference numerals as those illustrated in FIGS. 1 to 4 indicate the same configurations and processes, so the detailed description will be omitted.

Figure 5:
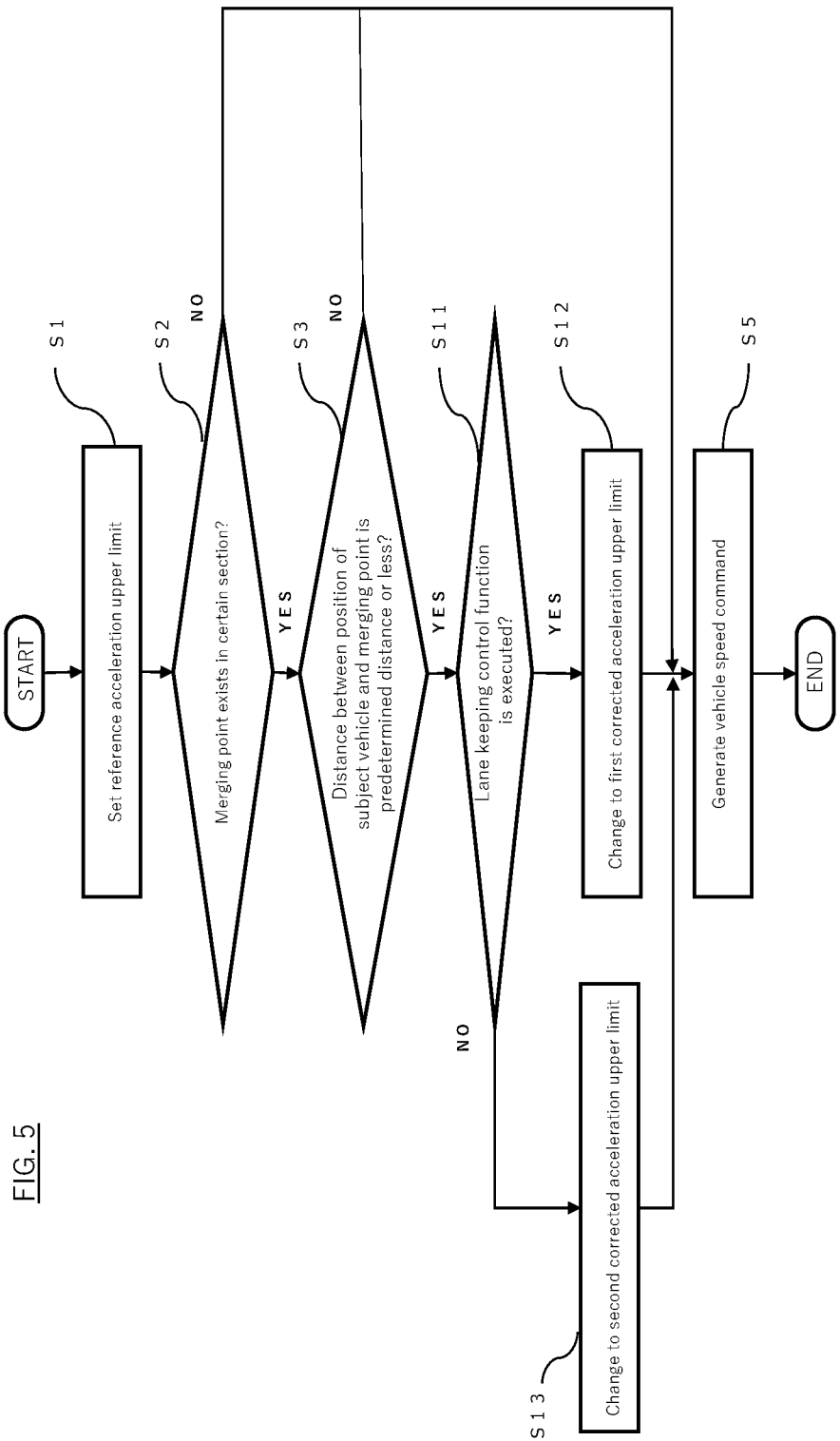
FIG. 5 is a flowchart illustrating another example of the driving control method according to a second embodiment.

As illustrated in FIG. 5, when a determination is made in step S3 that the distance (L1+L0) between the position P0 of the subject vehicle V0 and the merging point Px is the predetermined distance Ly or less, the control device 10 advances the process to step S11. In step S11, the control device 10 determines whether or not the lane keeping control function of the subject vehicle V0 is executed (whether the lane keeping control function is turned ON or OFF). When the lane keeping control function is executed (when the lane keeping control function is turned ON), the control device 10 advances the process to step S12. On the other hand, when the lane keeping control function is not executed (when the lane keeping control function is turned OFF), the control device 10 advances the process to step S13.

In step S12, the control device 10 changes the acceleration upper limit to a first corrected acceleration upper limit AU11 that is higher than the reference acceleration upper limit AU0. In the present embodiment, as illustrated in FIG. 6, the first corrected acceleration upper limit AU11 is the same value as the corrected acceleration upper limit AU1 illustrated in FIG. 4. That is, the first corrected acceleration upper limit AU11 has the same relationship as that of the corrected acceleration upper limit AU1 with respect to the transverse acceleration deviation dAt. Therefore, the detailed description of the first corrected acceleration upper limit AU11 will be omitted herein with reference to the content already described. Provided that the first corrected acceleration upper limit AU11 is higher than the reference acceleration upper limit AU0 and lower than a second corrected acceleration upper limit AU12, the value of the first corrected acceleration upper limit AU11 is not limited to the same value as the corrected acceleration upper limit AU1 illustrated in FIG. 4.

On the other hand, in step S13, the control device 10 changes the acceleration upper limit to the second corrected acceleration upper limit AU12 which is higher than the reference acceleration upper limit AU0 and the first corrected acceleration upper limit AU11. Specifically, as illustrated in FIG. 6, in a range in which the transverse acceleration deviation dAt is −dAt2 to dAt1 (−dAt2<dAt≤dAt1), the acceleration upper limit setting unit 11 sets the second corrected acceleration upper limit AU12 higher as the transverse acceleration At of the subject vehicle V0 is relatively lower than the target transverse acceleration Ata. That is, the control device 10 sets the second corrected acceleration upper limit AU12 so that the corrected acceleration upper limit corresponding to a first transverse acceleration becomes higher than the corrected acceleration upper limit corresponding to a second transverse acceleration whose height relative to the target transverse acceleration Ata is lower than the first transverse acceleration. In the example illustrated in FIG. 6, the second corrected acceleration upper limit AU12 is set so as to continuously increase as the relative height of the transverse acceleration At with respect to the target transverse acceleration Ata becomes lower, but the present invention is not limited to this, and the second corrected acceleration upper limit AU12 may be changed in a stepwise manner in accordance with the relative height of the transverse acceleration At with respect to the target transverse acceleration Ata. In the graph illustrated in FIG. 6, it is assumed that the transverse acceleration deviation dAt takes a positive value when the transverse acceleration At is lower than the target transverse acceleration Ata, and takes a negative value when the transverse acceleration At is higher than the target transverse acceleration Ata. In the range in which the transverse acceleration deviation dAt is −dAt2 to dAt1, the rate of change in the second corrected acceleration upper limit AU12 with respect to the transverse acceleration deviation dAt is larger than the rate of change in the first corrected acceleration upper limit AU11, but the present invention is not limited to this, and the rate of change in the second corrected acceleration upper limit AU12 and the rate of change in the first corrected acceleration upper limit AU11 may be the same.

Figure 6:
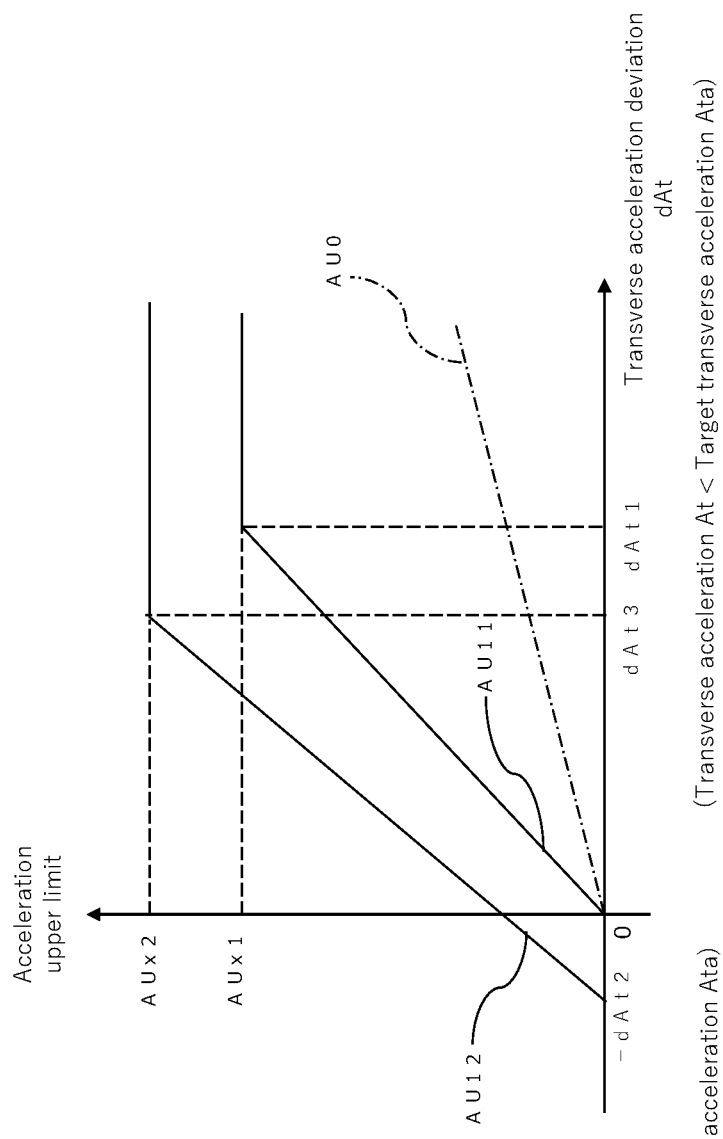
FIG. 6 is a graph illustrating the relationship between an acceleration upper limit that is set by the driving control method illustrated in FIG. 5 and a transverse acceleration deviation.

As illustrated in FIG. 6, when the transverse acceleration deviation dAt is dAt3, the second corrected acceleration upper limit AU12 becomes an acceleration upper limit threshold AUx2, and the second corrected acceleration upper limit AU12 is constant at the acceleration upper limit threshold AUx2 in a range in which the transverse acceleration deviation dAt is larger than dAt3. That is, the control device 10 sets the second corrected acceleration upper limit AU12 so that it becomes a predetermined acceleration upper limit threshold AUx2 or less. The acceleration upper limit threshold AUx2 for the second corrected acceleration upper limit AU12 is higher than the acceleration upper limit threshold AUx1 for the first corrected acceleration upper limit AU11. That is, when the lane keeping control function of the subject vehicle V0 is not executed, the control device 10 sets the acceleration upper limit threshold higher than that when the lane keeping control function is executed.

As described above, when the lane keeping control function of the subject vehicle V0 is not executed, the control device 10 of the driving control device 100 according to the present embodiment sets the corrected acceleration upper limit AU1 higher than the corrected acceleration upper limit AU1 when the lane keeping control function is executed. That is, the control device 10 sets the second corrected acceleration upper limit AU12 when the lane keeping control function of the subject vehicle V0 is not executed (when it is turned OFF) higher than the first corrected acceleration upper limit AU11 when the lane keeping control function is executed (when it is turned ON). Through this operation, when the lane keeping control function of the subject vehicle V0 is not executed, the transverse acceleration At which is relatively higher than the target transverse acceleration Ata is allowed as compared with when the lane keeping control function is executed, and the control device 10 can therefore further reduce the limitation of the front-rear acceleration Af along the curved route C. Thus, the control device 10 can further put ahead the timing of acceleration of the subject vehicle V0 traveling along the curved route C. On the other hand, when the lane keeping control function of the subject vehicle V0 is executed (when it is turned ON), the control device 10 sets the corrected acceleration upper limit AU1 to the first corrected acceleration upper limit AU11 lower than the second corrected acceleration upper limit AU12 and can thereby control the lateral behavior of the subject vehicle V0 so that the transverse acceleration At does not become higher than the target transverse acceleration Ata.

Moreover, the control device 10 sets the acceleration upper limit threshold AUx2 when the lane keeping control function of the subject vehicle V0 is not executed (when it is turned OFF) higher than the acceleration upper limit threshold AUx1 when the lane keeping control function is executed (when it is turned ON). Through this operation, when the lane keeping control function of the subject vehicle V0 is not executed, the control device 10 can further reduce the limitation of the front-rear acceleration Af along the curved route C less than that when the lane keeping control function is executed. The control device 10 can therefore further put ahead the timing of acceleration of the subject vehicle V0 traveling along the curved route C when the lane keeping control function of the subject vehicle V0 is not executed.

DESCRIPTION OF REFERENCE NUMERALS

100 Driving control device
1 Sensors
1a Acceleration detection unit
2 Subject vehicle position detection unit
3 Map database
4 Onboard equipment
5 Presentation device
6 Input device
7 Drive control device
10 Control device
11 Acceleration upper limit setting unit
Af Front-rear acceleration
At Transverse acceleration
Ata Target transverse acceleration
AU0 Reference acceleration upper limit
AU1 (AU11, AU12) Corrected acceleration upper limit
AUx1, AUx2 Acceleration upper limit threshold
C Curved route
V0 Subject vehicle
P0 Position of subject vehicle
Px Merging point
Ly Predetermined distance
Zx Certain section
Zd Downstream curve section

The invention claimed is:

1. A driving control method for controlling driving of a subject vehicle using a control device so that front-rear acceleration of the subject vehicle when traveling along a curved route becomes an acceleration upper limit or less, the control device controlling the driving of the subject vehicle, wherein
provided that a merging point exists in a certain section on a downstream side of the curved route, when a distance between a position of the subject vehicle traveling along the curved route and the merging point is a predetermined distance or less, the control device sets the acceleration upper limit to a corrected acceleration upper limit higher than a reference acceleration upper limit that is the acceleration upper limit when the merging point does not exist in the certain section.

2. The driving control method according to claim 1, wherein
when the distance between the position of the subject vehicle traveling along the curved route and the merging point is longer than the predetermined distance, the control device sets the acceleration upper limit to the reference acceleration upper limit, and
when the distance between the position of the subject vehicle traveling along the curved route and the merging point becomes the predetermined distance or less, the control device changes the acceleration upper limit from the reference acceleration upper limit to the corrected acceleration upper limit and controls the driving of the subject vehicle so that the front-rear acceleration becomes the corrected acceleration upper limit or less.

3. The driving control method according to claim 1, wherein when a lane keeping control function of the subject vehicle is executed, the control device sets the corrected acceleration upper limit higher than the corrected acceleration upper limit when the lane keeping control function is not executed.

4. The driving control method according to claim 1, wherein the control device sets the corrected acceleration upper limit based on a transverse acceleration deviation of transverse acceleration of the subject vehicle with respect to a predetermined target transverse acceleration.

5. The driving control method according to claim 4, wherein the control device sets the corrected acceleration upper limit so that the corrected acceleration upper limit corresponding to a first transverse acceleration becomes higher than the corrected acceleration upper limit corresponding to a second transverse acceleration whose height relative to the predetermined target transverse acceleration is lower than the first transverse acceleration in at least a part of a numerical range of the transverse acceleration deviation.

6. The driving control method according to claim 1, wherein the control device sets the corrected acceleration upper limit so that the corrected acceleration upper limit becomes a predetermined acceleration upper limit threshold or less.

7. The driving control method according to claim 6, wherein when a lane keeping control function of the subject vehicle is not executed, the control device sets the predetermined acceleration upper limit threshold higher than the predetermined acceleration upper limit threshold when the lane keeping control function is executed.

8. The driving control method according to claim 1, wherein when the subject vehicle is traveling in a downstream curve section of the curved route whose distance to the merging point is the predetermined distance or less, the control device determines that the distance between the position of the subject vehicle and the merging point is the predetermined distance or less.

9. A driving control device comprising a control device configured to control driving of a subject vehicle so that front-rear acceleration of the subject vehicle when traveling along a curved route becomes an acceleration upper limit or less, wherein
provided that a merging point exists in a certain section on a downstream side of the curved route, when a distance between a position of the subject vehicle traveling along the curved route and the merging point is a predetermined distance or less, the control device sets the acceleration upper limit to a corrected acceleration upper limit higher than a reference acceleration upper limit that is the acceleration upper limit when the merging point does not exist in the certain section.

* * * * *